(12) United States Patent
Chen et al.

(10) Patent No.: US 8,866,888 B2
(45) Date of Patent: Oct. 21, 2014

(54) 3D POSITIONING APPARATUS AND METHOD

(75) Inventors: Homer H. Chen, Taipei (TW); Ping-Cheng Chi, Taipei (TW)

(73) Assignee: National Taiwan University, Taipei (TW)

( * ) Notice: Subject to any disclaimer, the term of this patent is extended or adjusted under 35 U.S.C. 154(b) by 1106 days.

(21) Appl. No.: 12/649,029

(22) Filed: Dec. 29, 2009

(65) Prior Publication Data

US 2010/0309289 A1 Dec. 9, 2010

(30) Foreign Application Priority Data

Jun. 9, 2009 (TW) .............................. 98119187 A

(51) Int. Cl.
*H04N 13/02* (2006.01)
*G06T 7/00* (2006.01)

(52) U.S. Cl.
CPC .................................. *G06T 7/0018* (2013.01)
USPC ............... 348/46; 348/42; 348/135; 348/137; 348/141; 382/154; 382/106; 382/201; 382/190

(58) Field of Classification Search
USPC .............. 348/46, 42, 135, 137, 141; 382/106, 382/154, 190, 201
See application file for complete search history.

(56) References Cited

U.S. PATENT DOCUMENTS

| | | | | |
|---|---|---|---|---|
| 5,581,276 A | * | 12/1996 | Cipolla et al. | 345/156 |
| 5,682,198 A | * | 10/1997 | Katayama et al. | 348/47 |
| 5,757,674 A | * | 5/1998 | Marugame | 702/152 |
| 7,236,622 B2 | * | 6/2007 | Chen et al. | 382/132 |
| 2002/0180734 A1 | * | 12/2002 | Endoh et al. | 345/428 |
| 2008/0172201 A1 | * | 7/2008 | Kotake et al. | 702/150 |
| 2008/0228422 A1 | * | 9/2008 | Satoh | 702/92 |

* cited by examiner

*Primary Examiner* — Behrooz Senfi
*Assistant Examiner* — Maria Vazquez Colon
(74) *Attorney, Agent, or Firm* — Occhiuti & Rohlicek LLP

(57) ABSTRACT

A 3D positioning apparatus is used for an object that includes feature points and a reference point. The object undergoes movement from a first to a second position. The 3D positioning apparatus includes: an image sensor for capturing images of the object; and a processor for calculating, based on the captured images, initial coordinates of each feature point when the object is in the first position, initial coordinates of the reference point, final coordinates of the reference point when the object is in the second position, and final coordinates of each feature point. The processor calculates 3D translational information of the feature points using the initial and final coordinates of the reference point, and 3D rotational information of the feature points using the initial and final coordinates of each feature point. A 3D positioning method is also disclosed.

17 Claims, 9 Drawing Sheets

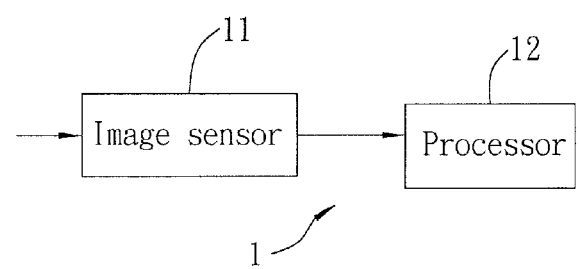
F I G. 1

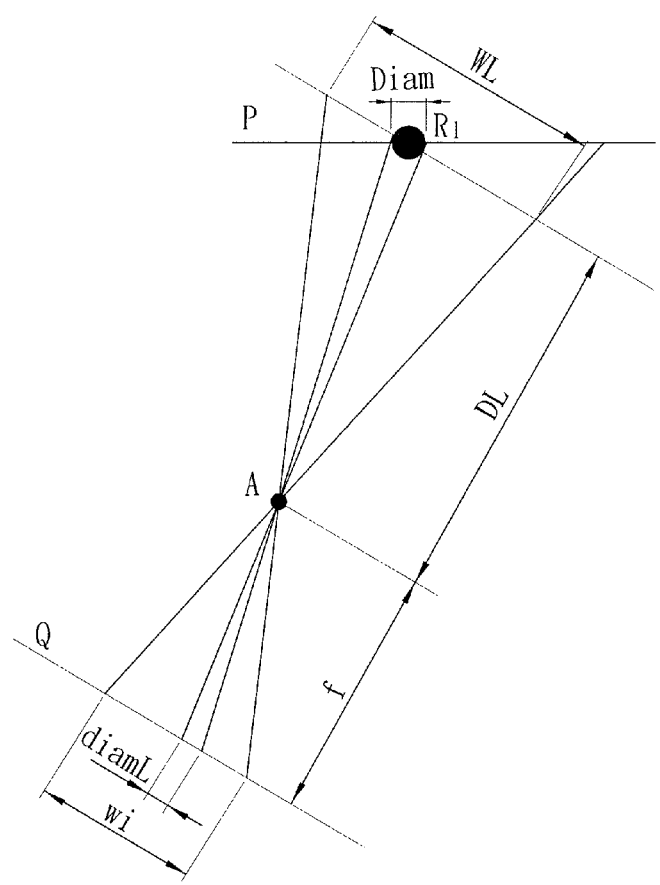
F I G. 4

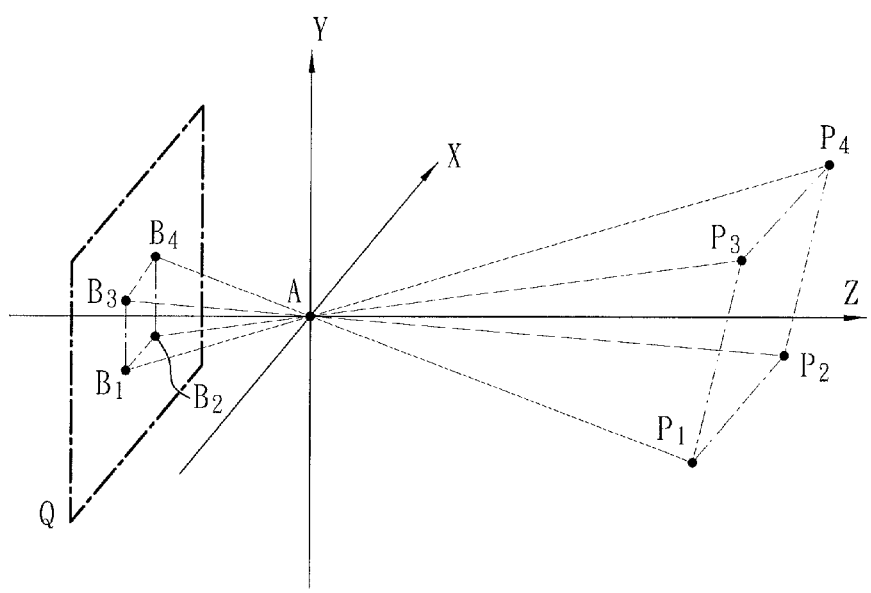
F I G. 8

3D POSITIONING APPARATUS AND METHOD

CROSS-REFERENCE TO RELATED APPLICATION

This application claims priority of Taiwanese Application No. 098119187, filed on Jun. 9, 2009, the contents of which are incorporated by reference herein.

BACKGROUND OF THE INVENTION

1. Field of the Invention

The present invention relates to a 3D (three-dimensional) positioning apparatus and a 3D positioning method, more particularly to an apparatus and method that provide 3D positioning function by image-processing techniques.

2. Description of the Related Art

Typically, in order to orient a 3D positioning apparatus, three degrees of movement information and three degrees of rotational information are needed. In other words, information including six degrees of freedom is needed. While conventional positioning apparatuses and methods can obtain 3D translational information by image processing, they rely on a 3-axis linear accelerator to obtain rotational information.

SUMMARY OF THE INVENTION

Therefore, the object of the present invention is to provide a three-dimensional (3D) positioning apparatus and a 3D positioning method by image-processing techniques.

According to one aspect, the 3D positioning apparatus of this invention is used for an object that includes a plurality of feature points. A reference point is formed by the feature points. The object undergoes movement from a first position to a second position.

The 3D positioning apparatus comprises an image sensor for capturing images of the object, and a processor coupled to the image sensor for receiving and processing the images captured thereby. The processor is configured to calculate on the basis of the images initial coordinates of each of the feature points when the object is in the first position, initial coordinates of the reference point when the object is in the first position, final coordinates of the reference point when the object is in the second position, and final coordinates of each of the feature points when the object is in the second position.

The processor is further configured to calculate 3D translational information of the feature points on the basis of the initial and final coordinates of the reference point.

The processor is further configured to calculate 3D rotational information of the feature points on the basis of the initial and final coordinates of each of the feature points.

The 3D positioning method is used for an object that includes a plurality of feature points. A reference point is formed by the feature points. The object undergoes movement from a first position to a second position. The 3D positioning method is implemented by an image sensor and a processor of a 3D positioning apparatus.

According to another aspect, the 3D positioning method of this invention comprises: configuring the image sensor to capture images of the object; configuring the processor, which is coupled to the image sensor for receiving the images captured thereby, to calculate on the basis of the images initial coordinates of each of the feature points when the object is in the first position, initial coordinates of the reference point when the object is in the first position, final coordinates of the reference point when the object is in the second position, and final coordinates of each of the feature points when the object is in the second position; configuring the processor to calculate 3D translational information of the feature points on the basis of the initial and final coordinates of the reference point; and configuring the processor to calculate 3D rotational information of the feature points on the basis of the initial and final coordinates of each of the feature points.

BRIEF DESCRIPTION OF THE DRAWINGS

Other features and advantages of the present invention will become apparent in the following detailed description of the preferred embodiments with reference to the accompanying drawings, of which:

FIG. 1 is a schematic circuit block diagram of the preferred embodiment of a 3D positioning apparatus according to the present invention;

FIG. 4 is a schematic diagram, illustrating an example of a point light source, the projection center of the 3D positioning apparatus of FIG. 1, and corresponding dimensions on an imaging plane;

FIG. 8 is a schematic diagram, illustrating an example of point light sources after rotation and a corresponding imaging plane.

DETAILED DESCRIPTION OF THE PREFERRED EMBODIMENTS

Referring to FIG. 1, the preferred embodiment of a 3D positioning apparatus 1 according to the present invention is used for an object (not shown) that includes a plurality of feature points. A reference point is formed by the feature points. The object undergoes movement from a first position to a second position. In the following, "before movement" will also be used to refer to the object, feature points, etc. when the object is in the first position, and "after movement" will also be used to refer to the object, feature points, etc. when the object is in the second position.

The 3D positioning apparatus 1 includes an image sensor 11 and a processor 12.

In this embodiment, the object includes a light source plate that has four feature points forming a square. Each feature point is formed by focusing light emitted from a light-emitting diode (LED) emitter that includes three infrared LEDs. However, the present invention is not limited to being used for an object in which the feature points are formed by an infrared LED emitter with three or any number of LEDs, and the present invention may be used for an object in which the feature points are formed by light emitted from any directional light source. In some embodiments, the feature points are formed in a completely different manner, as will be described below with reference to the modified preferred embodiment.

The light emitted from the point light sources is projected onto an imaging plane of the image sensor 11 through a projection center (A) of the 3D positioning apparatus 1 (see below). The image sensor 11 is used to capture 2D images of the point light sources for subsequent transmission to the processor 12.

The processor 12 first executes a calibration procedure.

Figure 2:
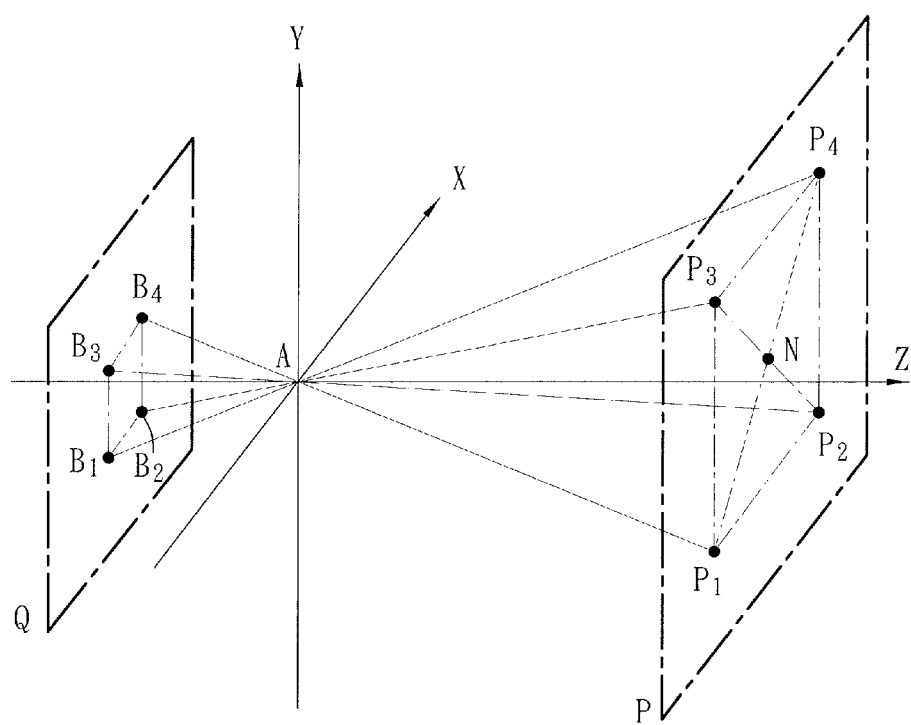
FIG. 2 is a schematic diagram, illustrating an example of a positional relation between a light source plane and an imaging plane during a calibration procedure of the present invention.

Referring to FIG. 2, when the processor 12 executes the calibration procedure, a light source plane (P) formed by four point light sources $P_1 \sim P_4$ in a 3D space is disposed to be parallel to an imaging plane (Q) of the image sensor 11. Therefore, there is no rotation taking place at this time (i.e., no rotational amount). Next, the processor 12 uses a motion algorithm proposed by this invention (and described in detail below) to calculate initial coordinates for each point light source $P_1 \sim P_4$ before movement of the object.

In this embodiment, in order to minimize error, during the calibration procedure, thirty previously captured images (i.e., previous to movement of the object) are used as a set of reference images, and after 3D coordinates of each light source $P_1 \sim P_4$ in each image are calculated, the 3D coordinates for each of the light sources $P_1 \sim P_4$ from the thirty images are averaged for use as the initial coordinates for each light source $P_1 \sim P_4$. However, the present invention is not limited to using a particular number of previously captured images, and this number may be adjusted for forming the reference images so as to optimally reduce error.

Next, the processor 12 calculates initial coordinates of a reference point (N) formed by the point light sources $P_1 \sim P_4$ based on the initial coordinates of the point light sources $P_1 \sim P_4$. In this embodiment, the reference point (N) is the geometric center of the point light sources $P_1 \sim P_4$.

It is to be noted that, when the processor 12 calculates the initial coordinates of each point light source $P_1 \sim P_4$ in the 3D space during the calibration procedure, the distance between the projection center (A) and the light source plane (P) is calculated according to a motion algorithm. This distance is the z-coordinate of each point light source in the light source plane (P). Next, the x- and y-coordinates of each point light source $P_1 \sim P_4$ in the 3D space is inferred. Therefore, the 3D initial coordinates of each point light source $P_1 \sim P_4$ may be acquired.

After the processor 12 finishes the calibration procedure, the translational information and the rotational information of each point light source $P_1 \sim P_4$ are simultaneously calculated.

First, with respect to calculating the translational information, when the image sensor 11 newly acquires an image (in this embodiment, this is an image after the thirtieth image), the processor 12 compares the images before and after movement of the object so as to calculate an x-axis motion amount (also referred to as a horizontal motion amount) and a y-axis motion value (also referred to as a vertical motion amount) of the geometric center (N) of the point light sources $P_1 \sim P_4$ over the images, that is, the imaging plane (Q). Next, using the image after movement and the motion algorithm, the processor 12 calculates the distance between the projection center (A) and the geometric center (N) of the point light sources $P_1 \sim P_4$, and converts this distance into a z-coordinate (hereinafter referred to as a depth coordinate) of the geometric center (N) in the 3D space after movement. Finally, the processor 12 calculates x- and y-coordinates (also referred to as horizontal and vertical coordinates, respectively) of the geometric center (N) in the 3D space according to the x-axis motion amount, the y-axis motion amount, and the z-coordinate, so as to acquire 3D coordinates of the geometric center (N) of the point light sources $P_1 \sim P_4$ after movement. These coordinates are also referred to as the final coordinates of the geometric center (N).

Next, the processor 12 compares the final coordinates of the geometric center (N) after movement with the initial coordinates of the geometric center (N) obtained by the calibration procedure, so as to obtain 3D translational information (i.e., x-, y-, z-axis motion amounts) after movement of the object.

B. K. P. Horn authored an article entitled "Closed-form solution of absolute orientation using unit quaternion," which was published in the Journal of the Optical Society of America in 1987. In this article, a rotation matrix is derived using a unit quaternion and a set of points in a predetermined space before and after movement of an object (referred to as the Horn algorithm hereinafter).

In the present invention, the processor 12 uses a rotation algorithm (to be described hereinafter) included in the Horn algorithm and proposed by this invention to calculate a depth proportion matrix of the point light sources $P_1 \sim P_4$ after movement, and obtains final coordinates of the point light sources $P_1 \sim P_4$ after movement. For reasons that will become evident below, the final coordinates of the point light sources $P_1 \sim P_4$ after movement are referred to as proportional coordinates hereinafter. Next, the initial coordinates of each point light source $P_1 \sim P_4$ obtained by the calibration procedure and the proportional coordinates of the point light sources $P_1 \sim P_4$ after movement are used in the Horn algorithm so as to obtain the corresponding rotation matrix for subsequent calculation of 3D translational information, in which the 3D translational information is the 3D translational information of the 3D positioning apparatus 1 after rotation.

The motion algorithm and the rotation algorithm proposed by this invention are described in detail below.

Figure 3:
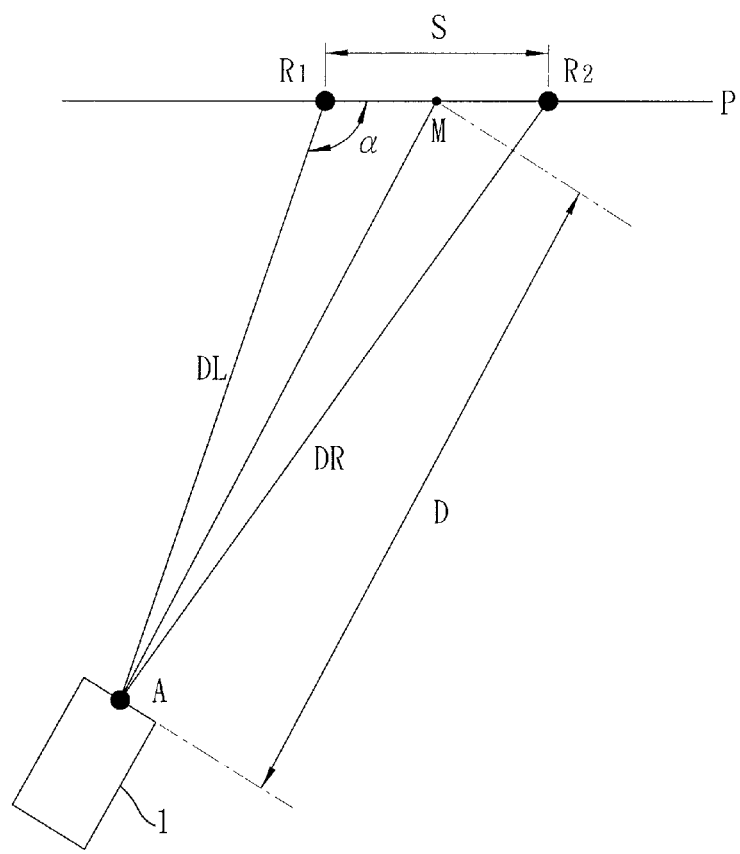
FIG. 3 is a schematic diagram, illustrating an example of positions of two point light sources and a projection center of the 3D positioning apparatus of FIG. 1.

In general, with reference to FIG. 3, two point light sources $R_1$, $R_2$ can be considered to be two circular point light sources. In FIG. 3, (P) is a light source plane, (A) is the projection center of the 3D positioning apparatus 1 of the preferred embodiment, (M) is a geometric center (M) of the point light sources $R_1$, $R_2$, (S) is a distance between the point light sources $R_1$, $R_2$, (D) is a distance between the geometric center (M) of the point light sources $R_1$, $R_2$ and the projection center (A) of the 3D positioning apparatus 1, (DL) is a distance between the point light source $R_1$ and the projection center (A), (DR) is a distance between the point light source $R_2$ and the projection center (A), and ($\alpha$) is an angle formed by the projection center (A), the point light source $R_1$, and the light source plane (P).

Using the triangles $\Delta R_1 A R_2$ and $\Delta R_1 AM$ in FIG. 3 and the cosine theorem, the following two formulas may be obtained:

$$\cos\alpha = \frac{DL^2 + S^2 - DR^2}{2 \cdot DL \cdot S} \quad (F.1)$$

$$\cos\alpha = \frac{DL^2 + \left(\frac{S}{2}\right)^2 - D^2}{2 \cdot DL \cdot \frac{S}{2}} \quad (F.2)$$

From Formulas (F.1) and (F.2), the distance (D) between the projection center (A) and the geometric center (M) of the point light sources $R_1$, $R_2$ can be obtained by the following formula:

$$D = \sqrt{\frac{DL^2 + DR^2 - \frac{S^2}{2}}{2}} \quad \text{(F.3)}$$

From Formula (F.3), after the distances (DL) and (DR) between the projection center (A) and the point light sources $R_1$, $R_2$ are obtained, since the distance (S) between the point light sources $R_1$, $R_2$ is known, the distance (D) between the projection center (A) and the geometric center (M) of the point light sources $R_1$, $R_2$ can be calculated.

The distance (DL) between the point light source $R_1$ and the projection center (A), and the distance (DR) between the point light source $R_2$ and the projection center (A) can be calculated as described below.

Referring to FIG. 4, an enlarged view of the point light source $R_1$ and the projection center (A) of FIG. 3 is shown. In FIG. 4, (Q) is an imaging plane of the 3D positioning apparatus 1, (f) is a focal distance of the image sensor 11, (Diam) is a diameter of the point light source $R_1$, (diamL) is a diameter of the image of the point light source $R_1$ on the imaging plane (Q), (WL) is a maximum width that can be captured on the light source plane (P) when the viewing angle of the image sensor 11 is unchanged and the distance between the point light source $R_1$ and the projection center (A) is (DL), and (wi) is a maximum width when the maximum width (WL) that can be captured on the light source plane (P) is projected onto the imaging plane (Q).

Using the similar triangle theorem, the following formulas may be obtained:

$$\frac{DL}{f} = \frac{Diam}{diamL} \quad \text{(F.4)}$$

$$\frac{DL}{f} = \frac{WL}{wi} \quad \text{(F.5)}$$

Furthermore, the following formula may be derived by setting the right-hand sides of Formulas (F.4), (F.5) equal to each other:

$$WL = \frac{Diam}{diamL} \times wi \quad \text{(F.6)}$$

Combining Formulas (F.5) and (F.6), the following formula may be derived:

$$DL = f \times \frac{WL}{wi(\text{mm})} = \frac{f}{wi(\text{mm})} \times \frac{Diam}{diamL} \times wi(\text{pixel}) \quad \text{(F.7)}$$

where the focal distance (f) and the maximum width (wi) in Formula (F.5) are in units of millimeters, and the imaging diameter (diamL) and the maximum width (wi) in Formula (F.6) are in units of pixels. Therefore, the two maximum widths (wi) in Formula (F.7) are represented by two different units, but the units of the distance (DL) obtained and that of the diameter (Diam) of the point light source $R_1$ are the same (centimeters in this embodiment). Moreover, among the foregoing variables, only the focal distance (f) is a predetermined fixed value, and the remainder of the variables are obtained from the captured images.

Referring back to FIG. 3, in a manner identical to calculating the distance (DL) between the point light source ($R_1$) and the projection center (A), the distance (DR) between the point light source ($R_2$) and the projection center (A) can be calculated using the following formula:

$$DR = f \times \frac{WL}{wi(\text{mm})} = \frac{f}{wi(\text{mm})} \times \frac{Diam}{diamR} \times wi(\text{pixel}) \quad \text{(F.8)}$$

Therefore, the distance (D) between the projection center (A) and the geometric center (M) of the point light sources $R_1$, $R_2$ can be calculated by combining Formulas (F.3), (F.7) and (F.8).

In this embodiment, referring again to FIG. 2, since the point light sources $P_1$~$P_4$ are arranged in a square, the distance between the geometric center (N) of the point light sources $P_1$~$P_4$ and the projection center (A) can be calculated from the distance between the geometric center of the point light sources $P_1$, $P_4$ and the projection center (A), or the distance between the geometric center of the point light sources $P_2$, $P_3$ and the projection center (A).

It is noted herein that the distance (D) is not the distance between the projection center (A) and the light source plane (P). Therefore, a projection model is used to calculate the horizontal and vertical positions of point light sources in an actual space. The projection model is described in the following.

Figure 5:
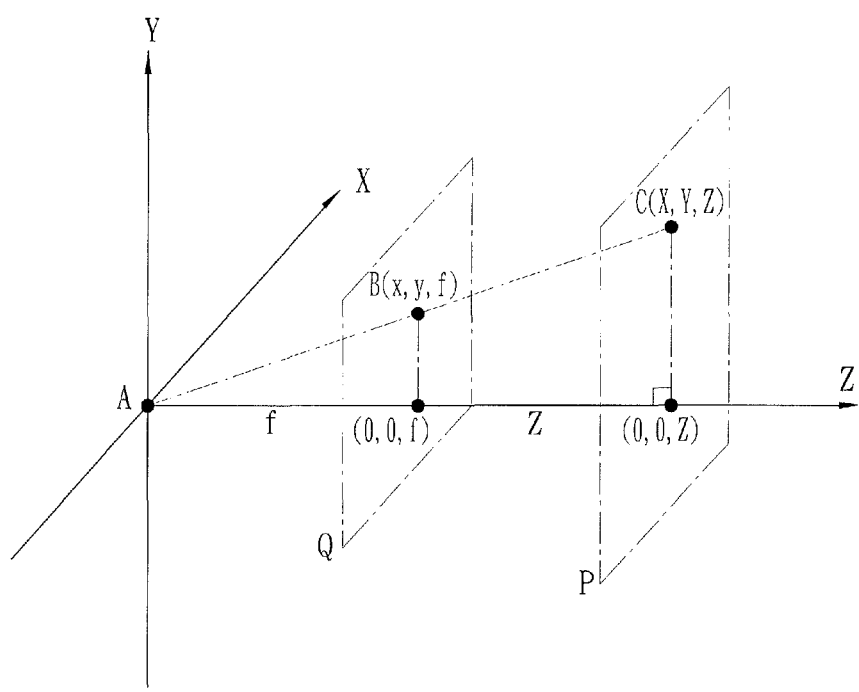
FIG. 5 is a schematic diagram of an exemplary projection model.

Referring to FIG. 5, it is assumed that in a 3D space there are a projection center (A), a point light source (C) having coordinates (X, Y, Z), a light source plane (P) on which the point light source (C) falls, and an imaging plane (Q), where a line formed between the projection center (A) and the point light source (C) extends through the imaging plane (Q) and intersects the imaging plane (Q) at a point (B), which has coordinates (x, y, f), where (f) is the focal distance of the image sensor 11 having the projection center (A), and (Z) is the distance between the projection center (A) and the light source plane (P).

Therefore, from FIG. 5, the relation between the point light source (C) and the point (B) may be expressed as follows:

$$\begin{bmatrix} x \\ y \\ f \end{bmatrix} = \begin{bmatrix} \frac{f}{Z} & 0 & 0 \\ 0 & \frac{f}{Z} & 0 \\ 0 & 0 & \frac{f}{Z} \end{bmatrix} \begin{bmatrix} X \\ Y \\ Z \end{bmatrix} \quad \text{(F.9)}$$

This model is constructed under the premise that the point light source (C) is moveable whereas the image sensor 11 is fixed. However, the opposite assumption may also used, that is, it may be assumed that the point light source (C) is fixed and the image sensor 11 is moveable. It is to be noted that the focal distance (f) is a predetermined value, and the x- and y-coordinates are obtained from the captured images.

Using Formula (F.9), the relationship between the horizontal and vertical positions of the point light sources and depth may be obtained as shown in the following formulas:

$$X = \frac{Z}{f} \cdot x \quad \text{(F.10)}$$

$$Y = \frac{Z}{f} \cdot y \quad \text{(F.11)}$$

The distance (D) between the projection center (A) and the geometric center (M) of the point light sources $R_1$, $R_2$ in FIG. 3 is related to the space coordinates (X, Y, Z) as shown by the following formula:

$$D = \sqrt{X^2 + Y^2 + Z^2} \quad \text{(F.12)}$$

Substituting (X), (Y) in Formula (F.12) by the right-hand side of Formulas (F.10) and (F.11), the depth coordinate (Z) may be obtained as follows:

$$Z = \sqrt{\frac{D^2}{1 + \left(\frac{x}{f}\right)^2 + \left(\frac{y}{f}\right)^2}} \quad \text{(F.13)}$$

The depth coordinate (Z) is the vertical distance from the projection center (A) to the light source plane (P), that is, the z-coordinate of the point light source (C) is (Z).

Lastly, the x-coordinate (X) and the y-coordinate (Y) of the point light source (C) are derived by substituting the depth coordinate (Z) and the coordinates (x, y, f) of the point (B) at the imaging plane (Q) into Formulas (F.10) and (F.11).

Moreover, in this embodiment, when the distances between two point light sources and the projection center (A) are equal or the difference therebetween is negligible, the formula for calculating the depth coordinate (Z) is as shown below.

Figure 6:
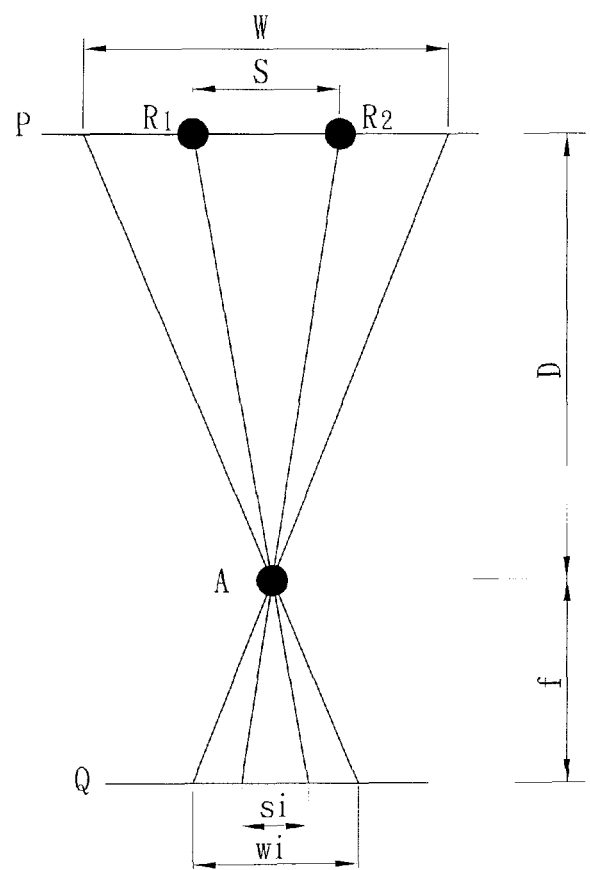
FIG. 6 is a schematic diagram, illustrating an example of imaging positions of two point light sources and a projection center of the 3D positioning apparatus of FIG. 1 when distances between the two point light sources and the projection center are the same or substantially the same.

In FIG. 6, which is a special case of FIG. 3, (P) is a light source plane, (Q) is an imaging plane, (A) is the projection center of the 3D positioning apparatus 1 of the preferred embodiment, (S) is a distance between point light sources $R_1$, $R_2$, (f) is the focal distance of the image sensor 11, and (D) is a distance between a geometric center of the point light sources $R_1$, $R_2$ and the projection center (A) of the 3D positioning apparatus 1. The geometric center is not indicated in FIG. 6 for reasons explained directly below.

When the light source plane (P) is nearly parallel to the imaging plane (Q), the distance (D) is the distance between the projection center (A) and the light source plane (P), that is, the depth coordinate (Z). Hence, the geometric center of the point light sources $R_1$, $R_2$ need not be considered for this special case.

The imaging method of the two point light sources $R_1$, $R_2$ is now examined. (W) is a maximum width that can be captured on the light source plane (P) when the viewing angle of the image sensor 11 is unchanged and the vertical distance between the point light sources $R_1$, $R_2$ and the projection center (A) are both (D), (wi) is a maximum width when the maximum width (W) that can be captured on the light source plane (P) is projected onto the imaging plane (Q), and (si) is a maximum width when the maximum width (S) that can be captured on the light source plane (P) is projected onto the imaging plane (Q).

By the similar triangle theorem, the following formula may be derived:

$$\begin{cases} \dfrac{D}{f} = \dfrac{S}{si} \\ \dfrac{D}{f} = \dfrac{W}{wi(\text{mm})} \end{cases} \quad \text{(F.14)}$$

From Formula (F.14), the following formula may be derived:

$$\frac{W}{wi(\text{mm})} = \frac{S}{si} \quad \text{(F.15)}$$

Changing wi (mm) into wi (pixel) in Formula (F.15), the formula for maximum width (W) can be expressed as follows:

$$W = \frac{S}{si} \times wi(\text{pixel}) \quad \text{(F.16)}$$

Combining Formulas (F.14) and (F.16), the following formula may be obtained:

$$D = \frac{f}{wi(\text{mm})} \times \frac{S}{si} \times wi(\text{pixel}) \quad \text{(F.17)}$$

As described above, when the light source plane (P) is substantially parallel to the imaging plane (Q), the distance (D) is the distance between the projection center (A) and the light source plane (P), that is, the depth coordinate (Z).

Further, the depth coordinate (Z) is the vertical distance between the projection center (A) and the light source plane (P), that is, the z-coordinate of the point light sources $R_1$, $R_2$ is the depth coordinate (Z).

Stated differently, if a difference between the distances between the point light sources $R_1$, $R_2$ and the projection center (A) is less than a threshold distance, an actual distance between the point light sources $R_1$, $R_2$ and the projection center (A) is calculated based on a distance between the point light sources $R_1$, $R_2$ on the imaging plane (Q), and the depth coordinate (Z) of each of the point light sources $R_1$, $R_2$ is set as the actual distance between the point light sources $R_1$, $R_2$ and the projection center (A).

Lastly, the x-coordinate (X) and the y-coordinate (Y) of the point light sources $R_1$, $R_2$ are derived by substituting the depth coordinate (Z) and the coordinates (x, y, f) of the point (B) on the imaging plane (Q) into Formulas (F.10) and (F.11).

The rotation algorithm of the present invention will now be described.

Referring to FIG. 5, after the point light source (C) in the projection model undergoes movement, the relation between the point light source (C) and the point (B) is changed into:

$$\begin{bmatrix} x \\ y \\ f \end{bmatrix} = \begin{bmatrix} \frac{f}{Z} & 0 & 0 \\ 0 & \frac{f}{Z} & 0 \\ 0 & 0 & \frac{f}{Z} \end{bmatrix} \left( R \begin{bmatrix} X \\ Y \\ Z \end{bmatrix} + \begin{bmatrix} T_x \\ T_y \\ T_z \end{bmatrix} \right) \quad (F.18)$$

where $T_x$, $T_y$, $T_z$ represent 3D motion amounts, and (R) is a rotation matrix that has 3D rotation amounts. The formulas for the rotation matrix (R) are as follows:

$$R = R_x \times R_y \times R_z \quad (F.19)$$

$$R_x = \begin{bmatrix} 1 & 0 & 0 \\ 0 & \cos\theta_x & -\sin\theta_x \\ 0 & \sin\theta_x & \cos\theta_x \end{bmatrix} \quad (F.20)$$

$$R_y = \begin{bmatrix} \cos\theta_y & 0 & -\sin\theta_y \\ 0 & 1 & 0 \\ \sin\theta_y & 0 & \cos\theta_y \end{bmatrix} \quad (F.21)$$

$$R_z = \begin{bmatrix} \cos\theta_z & -\sin\theta_z & 0 \\ \sin\theta_z & \cos\theta_z & 0 \\ 0 & 0 & 1 \end{bmatrix} \quad (F.22)$$

where $R_x$, $R_y$, $R_z$ represent rotational amounts about the X-, Y-, Z-axes, respectively, and $\theta_x$, $\theta_y$, $\theta_z$ represent rotation angles relative to the X-, Y-, Z-axes, respectively.

Figure 7:
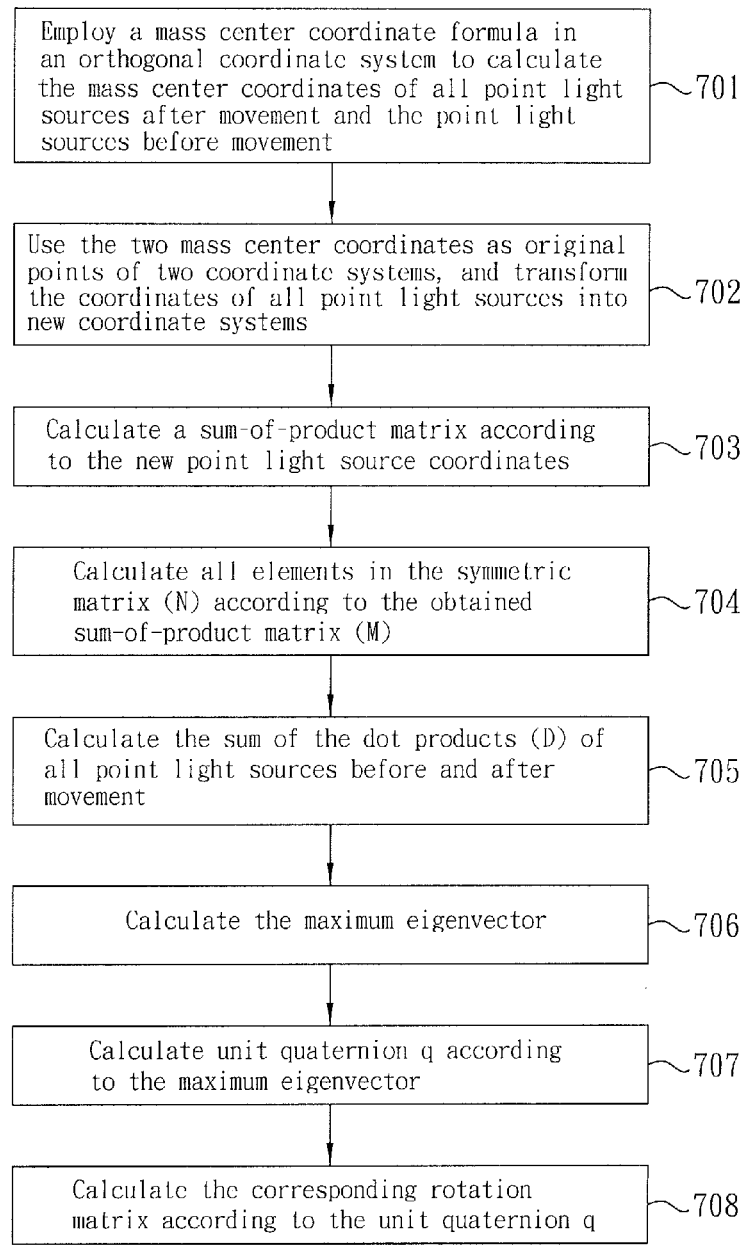
FIG. 7 is a flowchart of the steps involved in a Horn algorithm.

The Horn algorithm is shown in FIG. 7. From FIG. 7, it may be determined that, if the spatial coordinates of the point light sources before and after movement are determined, then the corresponding rotation matrix (R) can be calculated using the Horn algorithm for further acquisition of rotational information in a 3D space (for example, rotation angles or rotation amounts).

Referring back to FIG. 2, first, the spatial positions before movement are obtained by calculating the initial coordinates of the point light sources $P_1 \sim P_4$ using the calibration procedure.

Next, referring to FIGS. 2 and 8, spatial positions after movement are calculated. Since in the motion algorithm, only the distance between the projection center (A) and the light source plane (P) can be calculated, when the light source plane (P) undergoes movement, the depth coordinates of each point light source $P_1 \sim P_4$ on the light source plane (P) change accordingly. Hence, the depth coordinate (that is, z-coordinate) of each point light source $P_1 \sim P_4$ after movement cannot be calculated by the motion algorithm. Therefore, a depth ratio procedure described below is used in the rotation algorithm to determine the depth coordinates of the point light sources $P_1 \sim P_4$ after movement.

After the point light sources $P_1 \sim P_4$ begin to move, although the positions of the point light sources $P_1 \sim P_4$ are changed, the point light sources $P_1 \sim P_4$ retain their square shape at all times. Therefore, this can be mathematically represented according to the geometric condition of the square as follows:

$$\begin{cases} \overrightarrow{P_1P_2} = \overrightarrow{P_3P_4} \\ \overline{P_1P_2} = \overline{P_1P_3} \\ \overline{P_2P_1} \perp \overline{P_3P_1} \end{cases} \quad (F.23)$$

Indicated as 3D coordinates and assuming that the coordinates of $P_1$ are $(X_1, Y_1, Z_1)$, the coordinates of $P_2$ are $(X_2, Y_2, Z_2)$, the coordinates of $P_3$ are $(X_3, Y_3, Z_3)$, and the coordinates of $P_4$ are $(X_4, Y_4, Z_4)$, then Formula (F.19) can be shown by a set of spatial position formulas as follows:

$$\begin{cases} X_2 - X_1 = X_4 - X_3 \\ Y_2 - Y_1 = Y_4 - Y_3 \\ Z_2 - Z_1 = Z_4 - Z_3 \\ (X_2 - X_1)^2 + (Y_2 - Y_1)^2 + (Z_2 - Z_1)^2 = \\ \quad (X_3 - X_1)^2 + (Y_3 - Y_1)^2 + (Z_3 - Z_1)^2 \\ (X_2 - X_1)(X_3 - X_1) + (Y_2 - Y_1)(Y_3 - Y_1) + (Z_2 - Z_1)(Z_3 - Z_1) = 0 \end{cases} \quad (F.24)$$

Next, the set of Formulas (F.24) is changed into a least squares problem, and errors of the Formulas (F.24) are reduced to be as small as possible.

$$\begin{cases} X_2 - X_1 - (X_4 - X) = 0 \\ Y_2 - Y_1 - (Y_4 - Y_3) = 0 \\ Z_2 - Z_1 - (Z_4 - Z_3) = 0 \\ (X_2 - X_1)^2 + (Y_2 - Y_1)^2 + (Z_2 - Z_1)^2 - \\ \quad (X_3 - X_1)^2 - (Y_3 - Y_1)^2 - (Z_3 - Z_1)^2 = 0 \\ (X_2 - X_1)(X_3 - X_1) + (Y_2 - Y_1)(Y_3 - Y_1) + (Z_2 - Z_1)(Z_3 - Z_1) = 0 \end{cases} \quad (F.25)$$

In the set of Formulas (F.25), since non-linear formulas are included therein, there is no closed-form solution for the set of Formulas (F.25). Therefore, this invention uses a Gaussian-Newton algorithm to solve the non-linear least squares set of Formulas (F.25) by the non-linear regression method.

First, the depth coordinate value $(Z_1)$ of the point light source $P_1$ is treated as a standard unit length, and the depth coordinate values of the other point light sources $P_2, P_3, P_4$ are set to be multiples of $(Z_1)$. Therefore, $(Z_2), (Z_3), (Z_4)$ become values proportional to $(Z_1)$. As a result, the number of variables is reduced to 1 (that is, $Z_1$), and the four depth variables become a depth proportional form.

Since the x- and y-coordinates of the four point light sources $P_1 \sim P_4$ projecting on the imaging plane (Q) are known, after the depth proportions of the four point light sources $P_1 \sim P_4$ are obtained, based on the projection model and Formulas (F.10), (F.11), the X- and Y-coordinates of the four point light sources $P_1 \sim P_4$ in the space can be found. However, the spatial positions of the four point light sources $P_1 \sim P_4$ take $(Z_1)$ as the unit length. That is, the actual spatial positions of the four point light sources $P_1 \sim P_4$ only differ from the derived proportional coordinates by a unit proportional coefficient $(Z_1)$.

Next, the depth proportion form is represented by a depth proportion matrix (Z) as in the following:

$$Z = \begin{bmatrix} Z_2 \\ Z_3 \\ Z_4 \end{bmatrix} \quad (F.26)$$

The depth proportion variation matrix $\Delta Z$ of the depth proportion matrix (Z) is updated recursively until each computation result approaches an optimal solution. The relation between the depth proportion matrix (Z) after updating and the depth proportion matrix (Z) prior to updating is as shown below:

$$Z^{k+1}=Z^k+\Delta Z \quad (F.27)$$

where (k) is the number of recursions, that is, the number of times computation is repeated.

Moreover, the initial value of the depth proportion matrix (Z) is set to 1, after which the depth proportion variation matrix ΔZ is updated continually until the set of Formulas (F.25) converge. The depth proportion variation matrix ΔZ is formed by two matrices, namely, a Jacobian matrix (J) and a residual difference matrix Δy. The Jacobian matrix (J) is formed by the partial derivative functions formed by the five formulas in the set of Formulas (F.25) as a limiting condition. If the five formulas in the set of Formulas (F.25) are represented by $F_1, F_2, F_3, F_4, F_5$, then the Jacobian matrix (J) may be as follows:

$$J = \begin{bmatrix} \frac{\partial F_1}{\partial Z_2} & \frac{\partial F_1}{\partial Z_3} & \frac{\partial F_1}{\partial Z_4} \\ \frac{\partial F_2}{\partial Z_2} & \frac{\partial F_2}{\partial Z_3} & \frac{\partial F_2}{\partial Z_4} \\ \frac{\partial F_3}{\partial Z_2} & \frac{\partial F_3}{\partial Z_3} & \frac{\partial F_3}{\partial Z_4} \\ \frac{\partial F_4}{\partial Z_2} & \frac{\partial F_4}{\partial Z_3} & \frac{\partial F_4}{\partial Z_4} \\ \frac{\partial F_5}{\partial Z_2} & \frac{\partial F_5}{\partial Z_3} & \frac{\partial F_5}{\partial Z_4} \end{bmatrix} \quad (F.28)$$

Moreover, after the depth proportion values $Z_2, Z_3, Z_4$ related to $Z_1$ are replaced in the set of Formulas (F.25), the residual difference matrix Δy may be obtained as follows:

$$\Delta y = \begin{bmatrix} -F_1(Z_2, Z_3, Z_4) \\ -F_2(Z_2, Z_3, Z_4) \\ -F_3(Z_2, Z_3, Z_4) \\ -F_4(Z_2, Z_3, Z_4) \\ -F_5(Z_2, Z_3, Z_4) \end{bmatrix} \quad (F.29)$$

Combining Formulas (F.28) and (F.29), the depth proportion variation matrix ΔZ can be represented by the following formula:

$$\Delta Z = (J^T J)^{-1} J^T \Delta y \quad (F.30)$$

Therefore, after the set of Formulas (F.25) converges, the depth proportion matrix (Z) in the Formula (F.26) is obtained. That is, the amount of the depth proportion variation in a 3D space of the four point light sources $P_1 \sim P_4$ can be acquired.

From the foregoing, the spatial positions before movement and the spatial proportional coordinates after movement of the four point light sources $P_1 \sim P_4$ may be obtained. Therefore, the spatial positions before movement and the spatial proportional coordinates after movement of the four point light sources $P_1 \sim P_4$ are placed into the Horn algorithm of FIG. 7. Since the Horn algorithm performs calculation based on a point in a space before movement and a coordinate in the space after movement, and according to Formula (F.30), the calculation outcomes of this embodiment are the spatial positions before movement and the spatial proportional coordinates after movement (including a horizontal proportion, a vertical proportion, and a depth proportion) of the point light sources $P_1 \sim P_4$.

In the following, the manner in which the Horn algorithm is used to calculate a rotational matrix according to a point in a space before movement and a coordinate after movement is explained. Also, the manner in which a rotational matrix is calculated by inserting the spatial positions before movement and the spatial coordinates after movement into the Horn algorithm is explained.

Referring back to FIG. 7, the Horn algorithm is as described below.

B. K. P. Horn proposed using the formula below to represent a mass point moving in a space, and in the description below, the mass point in the space refers to a point light source:

$$P_1 = SRP_R + T \quad (F.31)$$

where (S) is a scaling matrix, (R) is a rotation matrix, (T) is a translation matrix, ($P_1$) represents coordinates of the point light source after movement, ($P_R$) represents coordinates of the point light source before movement, (S), ($P_1$), ($P_R$) are known, and (R) and (T) are unknown.

In step 701, a mass center coordinate formula in an orthogonal coordinate system is first employed to calculate the mass center coordinates of all point light sources after movement and the point light sources before movement, and are represented by $\overline{P_R}, \overline{P_I}$, respectively.

In step 702, the two mass center coordinates $\overline{P_R}, \overline{P_I}$ are used as original points of two coordinate systems, and the coordinates of all point light sources are transformed into new coordinate systems, and are represented by $P'_{R,i}, P'_{I,i}$, respectively, as in the following:

$$P'_{R,i} = P_{R,i} - \overline{P_R} \quad (F.32)$$

$$P'_{I,i} = P_{I,i} - \overline{P_I} \quad (F.32)$$

where (i) represents the number of the point light source.

In step 703, a sum-of-product matrix (M) is calculated according to the new point light source coordinates. First, the error sum of squares of the coordinates of a point light source before and after movement is calculated as in the following:

$$E = \sum_{i=1}^{4} \|P'_{I,i} - (SRP'_{R,i} + T')\|^2 \quad (F.34)$$

$$= \sum_{i=1}^{4} \|P'_{I,i} - SRP'_{R,i}\|^2 - 2T' \sum_{i=1}^{4} \|P'_{I,i} - SRP'_{R,i}\| + 4\|T'\|^2$$

where $T'=T-\overline{P_I}+SR\overline{P_R}$, and the second item of Formula (F.34) can be simplified as follows:

$$\sum_{i=1}^{4} \|SRP'_{R,i}\| = S\sum_{i=1}^{4} \|RP'_{R,i}\| = S\sum_{i=1}^{4} \|P'_{R,i}\| = 0, \text{ 且}$$

$$\sum_{i=1}^{4} \|P'_{I,i}\| = 0$$

Since $P'_{R,i}, P'_{I,i}$ indicate the distance between the respective point light source and the mass center, the sum thereof indicates the sum of the relative distances between all the point light sources and the mass center before and after movement. Therefore, the second item of Formula (F.34) should be 0.

Thus, Formula (F.30) may be simplified as follows:

$$E = \sum_{i=1}^{4} \|P'_{I,i} - SRP'_{R,i}\|^2 + 4\|T'\|^2 \quad (F.35)$$

In order to minimize the error (E), the smallest values of two items in Formula (F.35) must be found. Therefore, T' in the second item is set to 0, such that the following may be obtained:

$$T = \overline{P}_I - SR\overline{P}_R \quad (F.36)$$

Next, after elimination of the second item, Formula (F.35) is expanded as follows:

$$E = \sum_{i=1}^{4} \|P'_{I,i}\|^2 - 2S \sum_{i=1}^{4} P'_{I,i} \cdot RP'_{R,i} + S^2 \sum_{i=1}^{4} \|P'_{R,i}\|^2 = \quad (F.37)$$

$$S_I - SD + S^2 S_R$$

In Formula (F.37), $S_I$, $S_R$ indicate the sum of squares of the distance between each point light source relative to the mass center before and after movement, respectively, and (D) indicates the sum of the dot products of all point light sources before and after movement. Since the sum of squares $S_I$, $S_R$ of the distance between each point light source relative to the mass center before and after movement is fixed, to minimize the error (E), the maximum of (D) has to be found. It is assumed that a unit quaternion ($\overset{\circ}{q}$) is as shown below:

$$\overset{\circ}{q} = q_0 + iq_x + jq_y + kq_z \quad (F.38)$$

The unit quaternion ($\overset{\circ}{q}$) is formed by a real part and three imaginary parts, and corresponds to the rotation matrix (R). Therefore, the rotation matrix (R) can be obtained by transformation of the unit quaternion ($\overset{\circ}{q}$).

By substituting the unit quaternion ($\overset{\circ}{q}$) in (D), the following Formula can be derived:

$$D = \sum_{i=1}^{4} P'_{R,i} \cdot P'_{I,i} = \quad (F.39)$$

$$\sum_{i=1}^{4} RP'_{R,i} \cdot P'_{I,i} = \sum_{i=1}^{4} \left( \overset{\circ}{q} \overset{\circ}{p}_{R,i} \overset{\circ}{q}^* \right) \cdot \overset{\circ}{p}_{I,i} = \sum_{i=1}^{4} \left( \overset{\circ}{q} \overset{\circ}{p}_{R,i} \right) \cdot \left( \overset{\circ}{p}_{I,i} \overset{\circ}{q} \right)$$

Formula (F.39) shows that (D) is formed by the product of two unit quaternions, and the result of the multiplication can be indicated by the matrices below:

$$\overset{\circ}{q} \overset{\circ}{p}_{R,i} = \begin{bmatrix} 0 & -X'_i & -Y'_i & -Z'_i \\ X'_i & 0 & Z'_i & -Y'_i \\ Y'_i & -Z'_i & 0 & X'_i \\ Z'_i & Y'_i & -X'_i & 0 \end{bmatrix} = \overline{R}_{R,i} \overset{\circ}{q} \quad (F.40)$$

$$\overset{\circ}{p}_{I,i} \overset{\circ}{q} = \begin{bmatrix} 0 & -x'_i & -y'_i & -z'_i \\ x'_i & 0 & z'_i & -y'_i \\ y'_i & -z'_i & 0 & x'_i \\ z'_i & y'_i & -x'_i & 0 \end{bmatrix} = R_{I,i} \overset{\circ}{q} \quad (F.41)$$

Combining Formulas (F.39), (F.40), and (F.41), (D) can be simplified as follows:

$$D = \sum_{i=1}^{4} \left( \overline{R}_{R,i} \overset{\circ}{q} \right) \cdot \left( R_{I,i} \overset{\circ}{q} \right) = \overset{\circ}{q}^T \left( \sum_{i=1}^{4} \overline{R}_{R,i}^T R_{I,i} \right) \overset{\circ}{q} = \overset{\circ}{q}^T N \overset{\circ}{q} \quad (F.42)$$

where N is a symmetric matrix.

After substituting Formulas (F.40) and (F.41) into Formula (F.42), the symmetric matrix (N) is as shown below:

$$N = \begin{bmatrix} (S_{xx} + S_{yy} + S_{zz}) & S_{yz} - S_{zy} & S_{zx} - S_{xz} & S_{xy} - S_{yx} \\ S_{yz} - S_{zy} & (S_{xx} - S_{yy} - S_{zz}) & S_{xy} + S_{yx} & S_{zx} + S_{xz} \\ S_{zx} - S_{xz} & S_{xy} + S_{yx} & (-S_{xx} + S_{yy} - S_{zz}) & S_{yz} + S_{zy} \\ S_{xy} - S_{yx} & S_{zx} + S_{xz} & S_{yz} + S_{zy} & (-S_{xx} - S_{yy} + S_{zz}) \end{bmatrix} \quad (F.43)$$

where $S_{xx}$ indicates the sum of products of the X'-coordinate of a point light source before movement and the x'-coordinate of the point light source after movement, and each of the remainder of the similar variables $S_{ab}$ indicates the sum of products of the a'-coordinate of a point light source before movement and the b'-coordinate of the point light source after movement.

Lastly, a sum-of-product matrix (M) is established as shown below to solve the symmetric matrix (N):

$$M = \begin{bmatrix} S_{xx} & S_{xy} & S_{xz} \\ S_{yx} & S_{yy} & S_{yz} \\ S_{zx} & S_{zy} & S_{zz} \end{bmatrix} \quad (F.44)$$

The computing formula of each element in the sum-of-product matrix (M) is as follows:

$$S_{xx} = \sum_{i=1}^{4} X'_i x'_i \quad (F.45)$$

$$S_{xy} = \sum_{i=1}^{4} X'_i y'_i \quad (F.46)$$

The remaining elements $S_{ab}$ are similar to Formulas (F.45) and (F.46), which is the sum of products of an a'-coordinate of a point light source before movement and a b'-coordinate of the point light source after movement.

It is to be noted that, from the sum-of-product matrix (M), all the sum of products of the relative positions of two coordinate axes are included in the matrix. That is to say, all space information in the least square difference problem is stored in the sum-of-product matrix (M). Furthermore, since all elements in the symmetric matrix (N) are derived from the subtraction and addition of all elements in the sum-of-product matrix (M), all space information is also included in the symmetric matrix (N).

In step 704, all elements in the symmetric matrix (N) are calculated according to the obtained sum-of-product matrix (M).

Next, in step 705, after all elements in the symmetric matrix (N) are computed, the sum of the dot products (D) of all point light sources before and after movement is calculated from Formula (F.38) as shown below.

Since the symmetric matrix (N) is a 4×4 matrix, there are four eigenvalues $\lambda_i$ and four eigenvectors $\overset{\circ}{e}$. After the four eigenvectors $\overset{\circ}{e}$ are substituted into Formula (F.38), a new formula is formed as follows:

$$\overset{\circ}{q} = \alpha_1 \overset{\circ}{e}_1 + \alpha_2 \overset{\circ}{e}_2 + \alpha_3 \overset{\circ}{e}_3 + \alpha_4 \overset{\circ}{e}_4 \qquad (F.47)$$

After Formula (F.47) is multiplied by the four eigenvalues $\lambda_i$ of the symmetric matrix (N), Formula (F.48) is obtained as follows:

$$N\overset{\circ}{q} = \alpha_1 \lambda_1 \overset{\circ}{e}_1 + \alpha_2 \lambda_2 \overset{\circ}{e}_2 + \alpha_3 \lambda_3 \overset{\circ}{e}_3 + \alpha_4 \lambda_4 \overset{\circ}{e}_4 \qquad (F.48)$$

After Formula (F.48) is substituted into Formula (F.42), the sum of the dot products (D) is as shown below:

$$D = \overset{\circ}{q}^T N \overset{\circ}{q} = \alpha_1^2 \lambda_1 + \alpha_2^2 \lambda_2 + \alpha_3^2 \lambda_3 + \alpha_4^2 \lambda_4 \qquad (F.49)$$

Since the maximum of the sum of the dot products (D) is required, it is assumed that $\lambda_1 > \lambda_2 > \lambda_3 > \lambda_4$. Therefore, Formula (F.49) may be re-written as:

$$D = \overset{\circ}{q}^T N \overset{\circ}{q} = \alpha_1^2 \lambda_1 + \alpha_2^2 \lambda_1 + \alpha_3^2 \lambda_1 + \alpha_4^2 \lambda_1 = \lambda_1 \qquad (F.50)$$

In step 706, the maximum eigenvector is calculated according to Formula (F.50) as follows:

$$\overset{\circ}{q} = \alpha_1 \overset{\circ}{e}_1 + \alpha_2 \overset{\circ}{e}_2 + \alpha_3 \overset{\circ}{e}_3 + \alpha_4 \overset{\circ}{e}_4 = \overset{\circ}{e}_1 \qquad (F.51)$$

In step 707, a unit quaternion $\overset{\circ}{q}$ is calculated according to the maximum eigenvector obtained in step 706. After the symmetric matrix (N) is calculated, four eigenvalues can be calculated using a quadratic polynomial, and then the eigenvectors corresponding to the maximum eigenvalues are unitized so as to obtain the unit quaternion $\overset{\circ}{q}$ which the rotation matrix corresponds to.

Lastly, in step 708, the corresponding rotation matrix is calculated according to the unit quaternion $\overset{\circ}{q}$ obtained in step 707 as follows:

$$R\overset{\circ}{P}_R = \overset{\circ}{q}\overset{\circ}{p}\overset{\circ}{q}^* = (Q\overset{\circ}{p})\overset{\circ}{q}^* = \overline{Q^T}(Q\overset{\circ}{p}) = (\overline{Q^T}Q)\overset{\circ}{p} \qquad (F.52)$$

Therefore, $\overline{Q^T}Q$ can be expanded as follows:

$$\overline{Q^T}Q = \begin{bmatrix} \overset{\circ}{q}\cdot\overset{\circ}{q} & 0 & 0 & 0 \\ 0 & (q_0^2 + q_x^2 - q_y^2 - q_z^2) & 2(q_xq_y - q_0q_z) & 2(q_xq_z + q_0q_y) \\ 0 & 2(q_yq_x + q_0q_z) & (q_0^2 - q_x^2 + q_y^2 - q_z^2) & 2(q_yq_z - q_0q_x) \\ 0 & 2(q_zq_x - q_0q_y) & 2(q_zq_y + q_0q_x) & (q_0^2 - q_x^2 - q_y^2 + q_z^2) \end{bmatrix} \qquad (F.53)$$

where since $\overset{\circ}{q}$ is a unit quaternion, (Q) must satisfy orthogonality, $\overset{\circ}{q}\cdot\overset{\circ}{q}=1$ indicates that the 3×3 sub-matrix at the right bottom corner in the matrix $\overline{Q^T}Q$ has to be an orthogonal matrix, and $\overset{\circ}{p}$ indicates a quaternion of a spatial position coordinate with a zero real part. Therefore, the rotation matrix can be represented by the following matrix:

$$R = \begin{bmatrix} (q_0^2 + q_x^2 - q_y^2 - q_z^2) & 2(q_xq_y - q_0q_z) & 2(q_xq_z + q_0q_y) \\ 2(q_yq_x + q_0q_z) & (q_0^2 - q_x^2 + q_y^2 - q_z^2) & 2(q_yq_z - q_0q_x) \\ 2(q_zq_x - q_0q_y) & 2(q_zq_y + q_0q_x) & (q_0^2 - q_x^2 - q_y^2 + q_z^2) \end{bmatrix} \qquad (F.54)$$

After the rotation matrix is calculated, the rotation amount and the rotation angle of each point light source after rotation can be calculated using Formulas (F.19)~(F.22).

In the Horn algorithm, although the rotation matrix is calculated according to the coordinates of the points in a space before and after movement, in the sum-of-product matrix (M), each matrix element is the sum of the product of two spatial positions, and therefore, each matrix element includes a unit proportional coefficient ($Z_1$). For the same reason, since each element of the symmetric matrix (N) is derived from the elements of the sum-of-product matrix (M), each element of the symmetric matrix (N) also includes a unit proportional coefficient ($Z_1$). Hence, in this embodiment, by using proportional coordinates after movement to replace the coordinates after movement, the sum-of-product matrix (M) and the symmetric matrix (N) can be deemed the originally defined matrices divided by a unit proportional coefficient ($Z_1$). According to linear algebra theory, eigenvectors of a matrix do not change by multiplication of the matrix by a constant coefficient. Since an eigenvector indicates a basis vector of a matrix, scaling the matrix only varies the eigenvalues, while the basis vector is not altered. That is, substituting the proportional coordinates of each point light source into the Horn algorithm does not change the final calculated rotation angle.

The modified preferred embodiment of the present invention is now described.

The modified preferred embodiment of the present invention differs from the previous preferred embodiment in that the feature points of an object do not need to be formed by light emitted from a directional light source, and instead, may be differentiated using color. That is, the colors of the feature points are different from the colors of other areas of the object and the background where the object is placed.

For instance, the object may be a plate or board that is red and square in shape, the background where the object is placed may be white, and a black label may be placed at each of the four corners of the object. After the image sensor 11 detects the object and forms an image, the processor 12 identifies the coordinates of the black labels on the object as the feature points of the object, and then the processor 12 proceeds with calculation of 3D translational information and 3D rotational information according to the four feature points.

Figure 9:
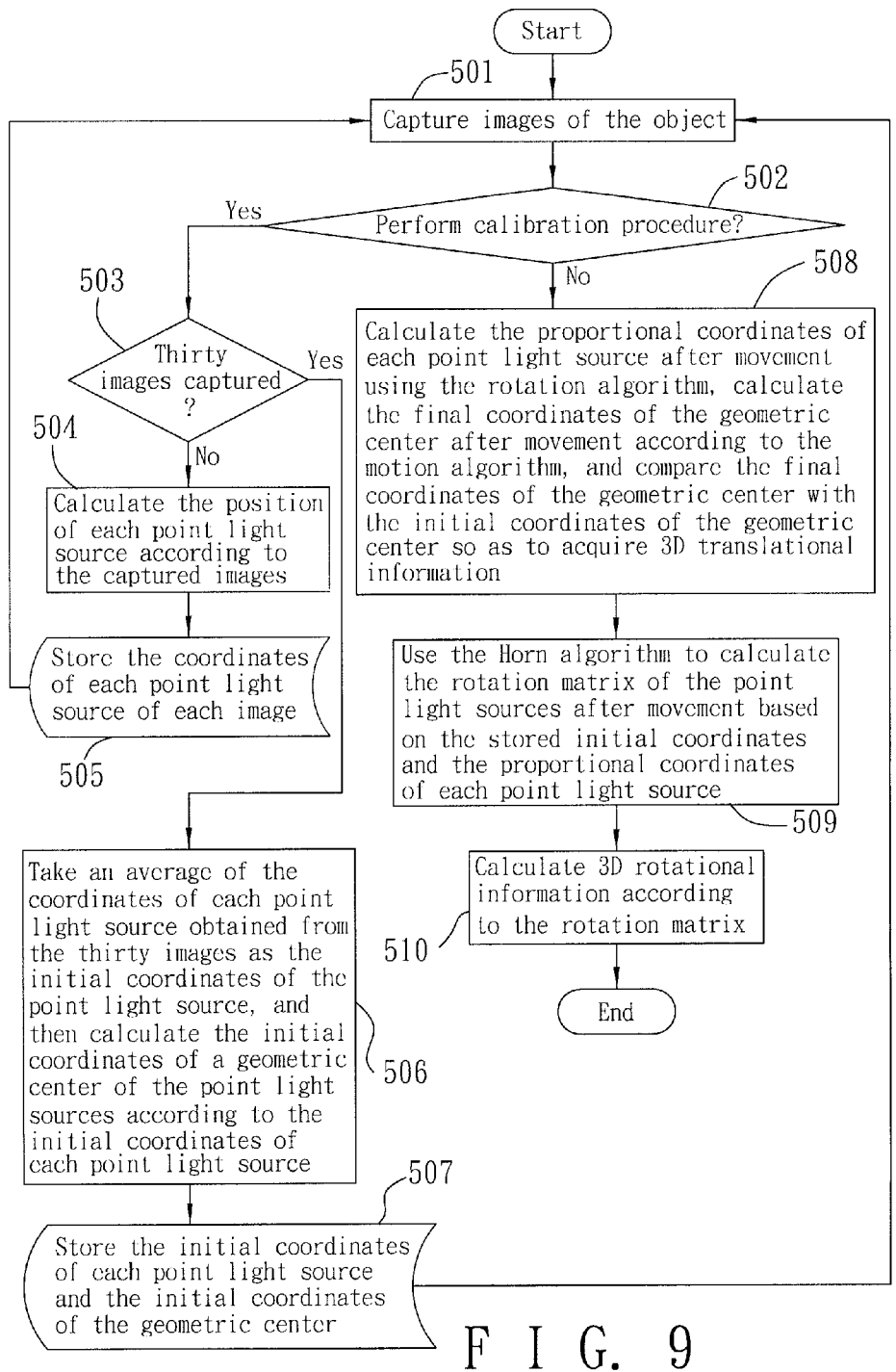
FIG. 9 is a flowchart of the preferred embodiment of a 3D positioning method according to the present invention.

The preferred embodiment of a 3D positioning method according to the invention will now be described with reference to FIGS. 1 and 9. The 3D positioning method is used for an object (not shown) that includes a plurality of feature points (hereinafter referred to as point light sources). A reference point is formed by the point light sources.

In step 501, the image sensor 11 captures images of the object, after which the image sensor 11 sends the images to the processor 12 for processing.

Next, in step 502, the processor 12 determines whether to perform a calibration procedure. In the affirmative, the flow goes to step 503. Otherwise, the flow goes to step 508.

In step 503, the processor 12 determines whether thirty images have been captured. In the affirmative, the flow goes to step 506. Otherwise, the flow goes to step 504.

In step 504, the processor 12 calculates the position of each point light source according to the images captured by the image sensor 11. It is to be noted herein that, during the calibration procedure, since a light source plane formed by the point light sources is parallel to an imaging plane (not shown) of the image sensor 11, a depth parameter of each point light source is the vertical distance from a projection center of the 3D positioning apparatus 1 to the light source plane.

In step 505, the processor 12 stores the coordinates of each point light source of each image, after which the flow goes back to step 501.

In step 506, the processor 12 takes an average of the coordinates of each point light source obtained from the thirty images as the initial coordinates of the point light source, and then calculates the initial coordinates of a geometric center formed by all the point light sources according to the initial coordinates of each point light source.

In step 507, the processor 12 stores the initial coordinates of each point light source and the initial coordinates of the geometric center obtained in step 506, after which the flow goes back to step 501.

In step 508, the processor 12 calculates the proportional coordinates of each point light source after movement using the aforementioned rotation algorithm, calculates the final coordinates of the geometric center after movement according to the aforementioned motion algorithm, and then compares the final coordinates of the geometric center after movement with the initial coordinates of the geometric center so as to acquire 3D translational information.

In step 509, the processor 12 uses the Horn algorithm to calculate the rotation matrix of the point light sources after movement based on the initial coordinates of each point light source stored in step 507 and the proportional coordinates of each point light source after movement calculated in step 508.

In step 510, the processor 12 calculates 3D rotational information (i.e., rotation angles about x, y and z axes) according to the rotation matrix.

In the 3D positioning method and apparatus of the present invention described above, image-processing techniques are used to determine both the 3D translational information and the 3D rotational information of the object.

Hence, a 3-axis linear accelerator is unneeded as in the case of the aforementioned conventional apparatuses and methods, such that costs are effectively reduced.

Moreover, the use of image-processing techniques also allows for real-time applications to be realized by the 3D positioning method and apparatus of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for positioning an object, the object undergoing movement from a first position to a second position in a three-dimensional (3D) space, said apparatus comprising: an image sensor for capturing images of the object, wherein said object has more than two feature points and a reference point derived from said feature points, said feature points having predetermined geometric relationships thereamong in the 3D space, said reference point and said feature points being on a common plane in the 3D space; and a processor coupled to said image sensor for receiving and processing the images captured thereby, said processor being configured to calculate, on the basis of the images and the predetermined geometric relationships among said feature points, initial coordinates of each of the feature points when the object is in the first position, initial coordinates of the reference point when the object is in the first position, final coordinates of the reference point when the object is in the second position, and final coordinates of each of the feature points when the object is in the second position; wherein said processor is further configured to calculate 3D translational information of the feature points on the basis of the initial and final coordinates of the reference point; and wherein said processor is further configured to calculate 3D rotational information of the feature points on the basis of the initial and final coordinates of each of the feature points; wherein said processor calculates the initial coordinates of each of the feature points by: calculating from at least one image of the object when it is in the first position a depth coordinate of said each of the feature points when the object is in the first position; and calculating a horizontal coordinate and a vertical coordinate of said each of the feature points when the object is in the first position on the basis of a relation among the horizontal coordinate, the vertical coordinate, and the depth coordinate of said each of the feature points; and wherein said processor calculates the depth coordinate of each of the feature points when the object is in the first position by: calculating a first distance between one of the feature points and a projection center of said apparatus; calculating a second distance between another one of the feature points and the projection center of said apparatus; and if a difference between the first and second distances is greater than or equal to a threshold distance, calculating a third distance from the projection center to a point between said one of the feature points and said another one of the feature points according to the first distance and the second distance, and calculating the depth coordinate of said each of the feature points when the object is in the first position according to the third distance.

2. The apparatus of claim 1, wherein, if the difference between the first and second distances is less than a threshold distance, calculating an actual distance between the feature points and the projection center based on a distance between the feature points on an imaging plane of said apparatus, and setting the depth coordinate of said each of the feature points when the object is in the first position as the actual distance between the feature points and the projection center.

3. The apparatus of claim 1, wherein said processor calculates the final coordinates of the reference point by: calculating a horizontal motion amount and a vertical motion amount of the reference point when the object is in the second position based on an image of the object in the first position and an image of the object in the second position; calculating a depth coordinate of the reference point when the object is in the second position based on the image of the object in the second position; and calculating the coordinates of the reference point when the object is in the second position using the horizontal motion amount, the vertical motion amount, a focal distance of said image sensor, and the depth coordinate of the reference point when the object is in the second position.

4. The apparatus of claim 3, wherein said processor calculates the depth coordinate of the reference point when the object is in the second position by: calculating a distance between a projection center of said apparatus and the reference point; and calculating the depth coordinate of the reference point when the object is in the second position according to the distance, and a relation among the horizontal motion amount, the vertical motion amount, and the depth coordinate of the reference point when the object is in the second position.

5. The apparatus of claim 1, wherein the final coordinates of each of the feature points are proportional coordinates, in which a coordinate of one of the feature points is used to determine coordinates for the remainder of the feature points.

6. The apparatus of claim 5, wherein said processor calculates the final coordinates of each of the feature points by: taking a depth coordinate of said one of the feature points as a standard unit length, and determining depth coordinates of said remainder of the feature points to be multiples of the standard unit length; and recursively updating the depth coordinates of said remainder of the feature points until values of the depth coordinates of said remainder of the feature points converge.

7. The apparatus of claim 5, wherein said processor calculates the 3D rotational information of the feature points using a Horn algorithm, and the initial and proportional coordinates of each of the feature points.

8. A method for causing an image sensor and a processor of a 3D positioning apparatus to determine a position of an object that undergoes movement from a first position to a second position in a three-dimensional (3D) space, said method comprising: (a) using the image sensor, capturing images of the object, the object having more than two identifiable feature points and a reference point derived from the feature points, the feature points having predetermined geometric relationships thereamong in the 3D space, the reference point and the feature points being on a common plane in the 3D space; (b) using the processor, which is coupled to the image sensor for receiving the images captured thereby, calculating, on the basis of the images and the predetermined geometric relationships among the feature points, initial coordinates of each of the feature points when the object is in the first position, initial coordinates of the reference point when the object is in the first position, final coordinates of the reference point when the object is in the second position, and final coordinates of each of the feature points when the object is in the second position; (c) using the processor, calculating 3D translational information of the feature points on the basis of the initial and final coordinates of the reference point; and (d) using the processor, calculating 3D rotational information of the feature points on the basis of the initial and final coordinates of each of the feature points; wherein, in step (b), the processor calculates the initial coordinates of each of the feature points by: (b1) calculating from at least one image of when the object is in the first position a depth coordinate of said each of the feature points when the object is in the first position; and (b2) calculating a horizontal coordinate and a vertical coordinate of said each of the feature points when the object is in the first position on the basis of a relation among the horizontal coordinate, the vertical coordinate, and the depth coordinate of said each of the feature points; and wherein, in step (b1), the processor calculates the depth coordinate of each of the feature points when the object is in the first position by: calculating a first distance between one of the feature points and a projection center of the 3D positioning apparatus; calculating a second distance between another one of the feature points and the projection center of the 3D positioning apparatus; and if a difference between the first and second distances is greater than or equal to a threshold distance, calculating a third distance from the projection center to a point between said one of the feature points and said another one of the feature points according to the first distance and the second distance, and calculating the depth coordinate of said each of the feature points when the object is in the first position according to the third distance.

9. The method of claim 8, wherein, in step (b1), if the difference between the first and second distances is less than a threshold distance, calculating an actual distance between the feature points and the projection center based on a distance between the feature points on an imaging plane of the 3D positioning apparatus, and setting the depth coordinate of said each of the feature points when the object is in the first position as the actual distance between the feature points and the projection center.

10. The-method of claim 8, wherein, in step (b), the processor calculates the final coordinates of the reference point by: (b3) calculating a horizontal motion amount and a vertical motion amount of the reference point when the object is in the second position based on an image of the object in the first position and an image of the object in the second position; (b4) calculating a depth coordinate of the reference point when the object is in the second position based on the image of the object in the second position; and (b5) calculating the coordinates of the reference point when the object is in the second position using the horizontal motion amount, the vertical motion amount, a focal distance of said image sensor, and the depth coordinate of the reference point when the object is in the second position.

11. The method of claim 10, wherein, in step (b4), the processor calculates the depth coordinate of the reference point when the object is in the second position by: calculating a distance between a projection center of the 3D positioning apparatus and the reference point; and calculating the depth coordinate of the reference point when the object is in the second position according to the distance, and a relation among the horizontal motion amount, the vertical motion amount, and the depth coordinate of the reference point when the object is in the second position.

12. The method of claim 8, wherein, in step (b), the final coordinates of each of the feature points are proportional coordinates, in which a coordinate of one of the feature points is used to determine coordinates for the remainder of the feature points.

13. The method of claim 12, wherein, in step (b), the processor calculates the final coordinates of each of the feature points by: taking a depth coordinate of said one of the feature points as a standard unit length, and determining depth coordinates of said remainder of the feature points to be multiples of the standard unit length; and recursively updating the depth coordinates of said remainder of the feature points until values of the depth coordinates of said remainder of the feature points converge.

14. The method of claim 13, wherein the depth coordinates of said remainder of the feature points are updated according to a Jacobian matrix and a residual difference matrix.

15. The method of claim 12, wherein, in step (d), the processor calculates the 3D rotational information of the feature points using a Horn algorithm, and the initial and proportional coordinates of each of the feature points.

16. The method of claim 8, wherein, in step (d), the processor calculates the 3D rotational information of the feature points on the basis of the initial and final coordinates of each of the feature points by calculating a rotation matrix corresponding to the feature points, and calculating a 3D rotation angle of each of the feature points according to the rotation matrix.

17. The method of claim 8, wherein, in step (b), the processor calculates the initial coordinates of each of the feature points by: for each of a predetermined number of images of when the object is in the first position, calculating coordinates for said each of the feature points; and averaging the coordinates for said each of the feature points to obtain the initial coordinates of said each of the feature points.

* * * * *